United States Patent
Gilbert (10) Patent No.: US 10,737,601 B2
(45) Date of Patent: Aug. 11, 2020

(54) SEAT BEAM CLAMP

(71) Applicant: Safran Seats USA LLC, Gainesville, TX (US)

(72) Inventor: Klay E. Gilbert, Lindsay, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/316,858

(22) PCT Filed: Jul. 18, 2016

(86) PCT No.: PCT/US2016/042789
§ 371 (c)(1),
(2) Date: Jan. 10, 2019

(87) PCT Pub. No.: WO2018/017043
PCT Pub. Date: Jan. 25, 2018

(65) Prior Publication Data
US 2019/0291616 A1    Sep. 26, 2019

(51) Int. Cl.
| | | |
|---|---|---|
| *B60N 2/68* | (2006.01) | |
| *F16B 2/18* | (2006.01) | |
| *F16B 3/00* | (2006.01) | |
| *B64D 11/06* | (2006.01) | |
| *B60N 2/24* | (2006.01) | |

(Continued)

(52) U.S. Cl.
CPC ............. *B60N 2/682* (2013.01); *F16B 2/18* (2013.01); *F16B 3/00* (2013.01); *B60N 2/242* (2013.01); *B60N 2002/684* (2013.01); *B61D 33/00* (2013.01); *B63B 2029/043* (2013.01); *B64D 11/0648* (2014.12)

(58) Field of Classification Search
CPC .......... B64D 11/0648; F16B 2/18; F16B 3/00; B61D 33/00; B63B 2029/043; B60N 2/682; B60N 2/242; B60N 2002/684
USPC ...................................... 297/440.15
See application file for complete search history.

(56) References Cited

U.S. PATENT DOCUMENTS 4,229,040 A * 10/1980 Howell .............. B64D 11/0648
297/440.1
5,183,313 A * 2/1993 Cunningham ......... B60N 2/242
248/429

(Continued)

FOREIGN PATENT DOCUMENTS

DE    102006015515 A1    10/2007

OTHER PUBLICATIONS

International Patent Application No. PCT/US2016/042789, International Search Report and Written Opinion; dated Apr. 13, 2017.

*Primary Examiner* — Mark R Wendell
(74) *Attorney, Agent, or Firm* — Kilpatrick Townsend & Stockton LLP (57) ABSTRACT

A beam clamp (124) for a passenger seat includes a keyhole (126) configured to flex outwardly from an un-flexed position to a flexed position. The diameter of the keyhole in the un-flexed position is less than the diameter of the keyhole in the flexed position. A method of assembling the passenger seat includes assembling a seat base and connecting a seat back to the seat base. Assembling the seat base includes flexing the keyhole of the beam clamp outwards from the un-flexed position to the flexed position and inserting a support beam within the keyhole in the flexed position.

16 Claims, 4 Drawing Sheets

(51) Int. Cl.
*B61D 33/00* (2006.01)
*B63B 29/04* (2006.01)

(56) References Cited

U.S. PATENT DOCUMENTS

| | | | | |
|---|---|---|---|---|
| 5,553,923 | A * | 9/1996 | Bilezikjian | B64D 11/06 |
| | | | | 297/232 |
| 6,749,266 | B2 * | 6/2004 | Williamson | B64D 11/06 |
| | | | | 297/248 |
| 9,718,552 | B2 * | 8/2017 | Zheng | B64D 11/0648 |
| 9,764,844 | B2 * | 9/2017 | Le | B64D 11/0639 |
| 2003/0094542 | A1 | 5/2003 | Williamson | |
| 2009/0108132 | A1 * | 4/2009 | Guttropf | B64D 11/06 |
| | | | | 244/122 R |
| 2009/0121523 | A1 * | 5/2009 | Johnson | B64D 11/0624 |
| | | | | 297/140 |
| 2012/0098322 | A1 * | 4/2012 | Muller | B64D 11/06 |
| | | | | 297/452.18 |
| 2012/0212020 | A1 | 8/2012 | Schiefer | |
| 2014/0375090 | A1 * | 12/2014 | Wegenka | B60N 2/242 |
| | | | | 297/188.09 |
| 2017/0021933 | A1 * | 1/2017 | Pozzi | B64D 11/0636 |

* cited by examiner

SEAT BEAM CLAMP

BACKGROUND

Field

This application relates to passenger seats, and more particularly to beam clamps for passenger seats.

Background Technology

Passenger vehicles, such as aircraft, buses, trains, ships, and automobiles, include passenger seat assemblies for passengers to sit in and utilize during travel. A passenger seat assembly commonly includes a seat back connected to a seat base, both of which may include comfort cushioning over a supportive framework. The seat base for passenger seats is generally formed by a pair of horizontal support beams (or tubes or rails) which extend across the front and rear of the seat, spreaders supported by the beams which extend along opposite sides of the seat for supporting the seat cushions and seat backs, and leg assemblies spaced along the length of the beams and connected to floor-mounted tracks for supporting the seats.

The spacing of spreaders and legs along the length of the beams will vary for different types of seats and different seating arrangements. The position of legs on seats nearest the aisle and seats nearest the wall of the aircraft may vary depending upon the structural design of the aircraft, the number of seats in the row and the location of the row of seats in the aircraft. The connections between spreaders and beams and between leg assemblies and beams often vary depending upon the location of the spreaders on the beams, the location of the legs on the beams, and/or whether the seat is a front facing seat or a rear facing seat.

In many cases, seat legs of the passenger seat assembly and/or spreaders of the passenger seat assembly are secured to the horizontal beams through clamps, fasteners, or a combination of clamps and fasteners.

Figure 3:
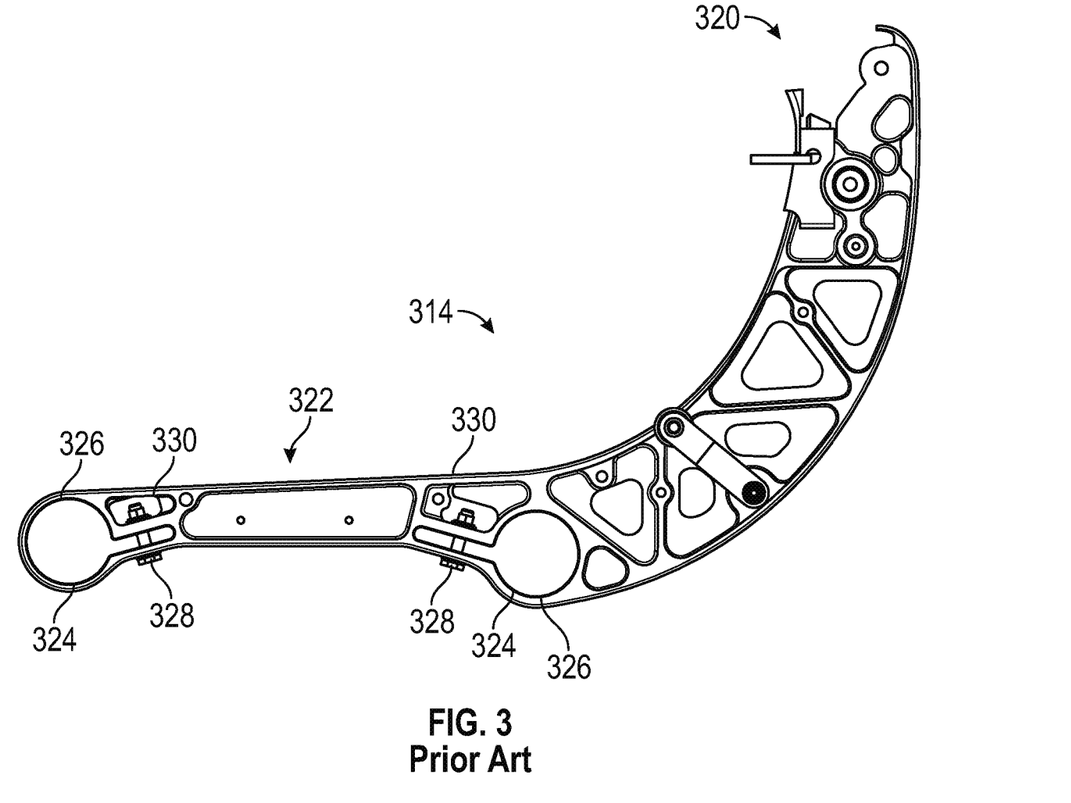
FIG. 3 is side view of a typical beam clamp.

Typical beam clamps can be integrally formed with other components of the passenger seat assembly, although they need not be. For example, FIG. 3 illustrates a spreader 314 including an aft connecting portion 320 and a forward connecting portion 322. The forward connecting portion 322 includes two beam clamps 324.

As illustrated in FIG. 3, the beam clamps 324 typically include keyholes 326 and fasteners 328. The diameter of a keyhole 326 is slightly larger than the largest diameter of the horizontal support beams. During assembly of a passenger seat, a horizontal support beam is positioned into a keyhole 326 and located laterally to its required position. The fastener 328 is tightened to flex the keyhole 326 closed, which reduces the diameter of the keyhole 326 until the beam clamps 324 clamp the spreader 314 to the horizontal support beam.

A problem with typical beam clamps, such as the beam clamp 324, is that significant time and effort may be spent by an installer to get the beam clamp to connect to oversized or misshapen support beams. For example, in some circumstances, the support beams may be oversized diametrically due to manufacturing tolerances and handling. Horizontal support beams that have an increased diameter may cause interferences when the horizontal support beam is slid into the keyhole 326. To accommodate the oversized support beams, the keyhole 326 must be reworked to remove material and increase the diameter of the keyhole 326, which takes away time and effort that could otherwise be used to assembly the passenger seat assembly.

Another problem with the typical beam clamp is that fastening hole 330 has limited space for placement and use of a tool for tightening the fastener 328. A further problem is that as the fastener 328 is tightened and the keyhole 326 is closed, a nut can be tightened past threads of the fastener 328. This may lead to a false sense of secured fastening as the clamping force may be insufficient despite the nut being tightened past the thread.

In view of the aforementioned problems associated with existing beam clamps, there is a need for an improved beam clamp for passenger seats.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat includes a seat back and a seat base connected to the seat back. The seat base includes a beam clamp comprising a keyhole configured to flex outwardly from an un-flexed position to a flexed position. A diameter of the keyhole in the un-flexed position is less than the diameter of the keyhole in the flexed position. In some cases, the seat base further includes a support beam defining a support beam diameter. In the flexed position, the diameter of the keyhole is greater than the support beam diameter. In some examples, the support beam is positioned within the keyhole of the beam clamp, and in the un-flexed position, the beam clamp clamps the support beam positioned within the keyhole. In various cases, the keyhole is biased towards the un-flexed position.

In some cases, the seat base comprises a spreader, and the beam clamp is a component of the spreader. In certain embodiments, the seat base comprises a seat leg, and the beam clamp is a component of the seat leg.

In some examples, the keyhole comprises a beam-receiving portion and a cam-receiving portion. In various examples, the passenger seat further includes a cam positioned within the cam-receiving portion of the keyhole. The cam is rotatable to flex the keyhole between the un-flexed position and the flexed position. In various embodiments, the cam is removably positioned within the cam-receiving portion.

According to certain embodiments of the present disclosure, a passenger seat base includes a support beam defining a support beam diameter and a beam clamp comprising a keyhole. The keyhole includes a beam-receiving portion and a cam-receiving portion. The beam-receiving portion is configured to flex outwardly from an un-flexed position to a flexed position. A diameter of the beam-receiving portion in the un-flexed position is less than the support beam diameter.

In certain cases, the passenger seat base further includes a cam removably positioned in the cam-receiving portion. The cam is rotatable between the flexed position and the un-flexed position. In some cases, the diameter of the beam-receiving portion of the keyhole in the flexed position is greater than the support beam diameter. In some embodiments, the beam-receiving portion is biased towards the un-flexed position. In certain embodiments, the passenger seat further includes a cam positioned within the cam-receiving portion of the keyhole. The cam is rotatable to flex the beam-receiving portion between the un-flexed position and the flexed position.

According to certain embodiments of the present disclosure, a method of assembling a passenger seat includes assembling a seat base and connecting a seat back to the seat base. Assembling the seat base includes flexing a keyhole of a beam clamp outwards from an un-flexed position to a flexed position and inserting a support beam within the keyhole in the flexed position.

In some aspects, flexing the keyhole of the beam clamp outwards includes positioning a cam within the keyhole and rotating the cam within the keyhole from an un-flexed position to a flexed position. In various aspects, assembling the seat base further includes returning the keyhole to the un-flexed position after inserting the support beam within the keyhole. In various cases, returning the keyhole to the un-flexed position further includes rotating a cam positioned within the keyhole from a flexed position to an un-flexed position. In some aspects, assembling the seat base further includes removing the cam from the keyhole after rotating the cam from the flexed position to the un-flexed position. In certain cases, a diameter of the keyhole in the un-flexed position is less than a support beam diameter of the support beam, and the diameter of the keyhole in the flexed position is greater than the support beam diameter of the support beam.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide passenger seats, and more particularly to beam clamps for passenger seats. While the beam clamps are discussed for use with aircraft seats, they are by no means so limited. Rather, embodiments of the beam clamps may be used in passenger seats or other seats of any type or otherwise as desired. Directional references such as "forward," "aft," "up," "down," "top," "left," "right," "front," "back," and "corners," among others are intended to refer to the orientation as illustrated and described in the figure (or figures) to which the components and directions are referencing.

In one aspect, disclosed is a beam clamp for a passenger seat assembly and associated methods, systems, devices, and various apparatus. The beam clamp comprises a keyhole that is configured to clamp onto a horizontal beam. It would be understood by one of skill in the art that the disclosed beam clamp is described in but a few exemplary aspects among many.

Figure 1:
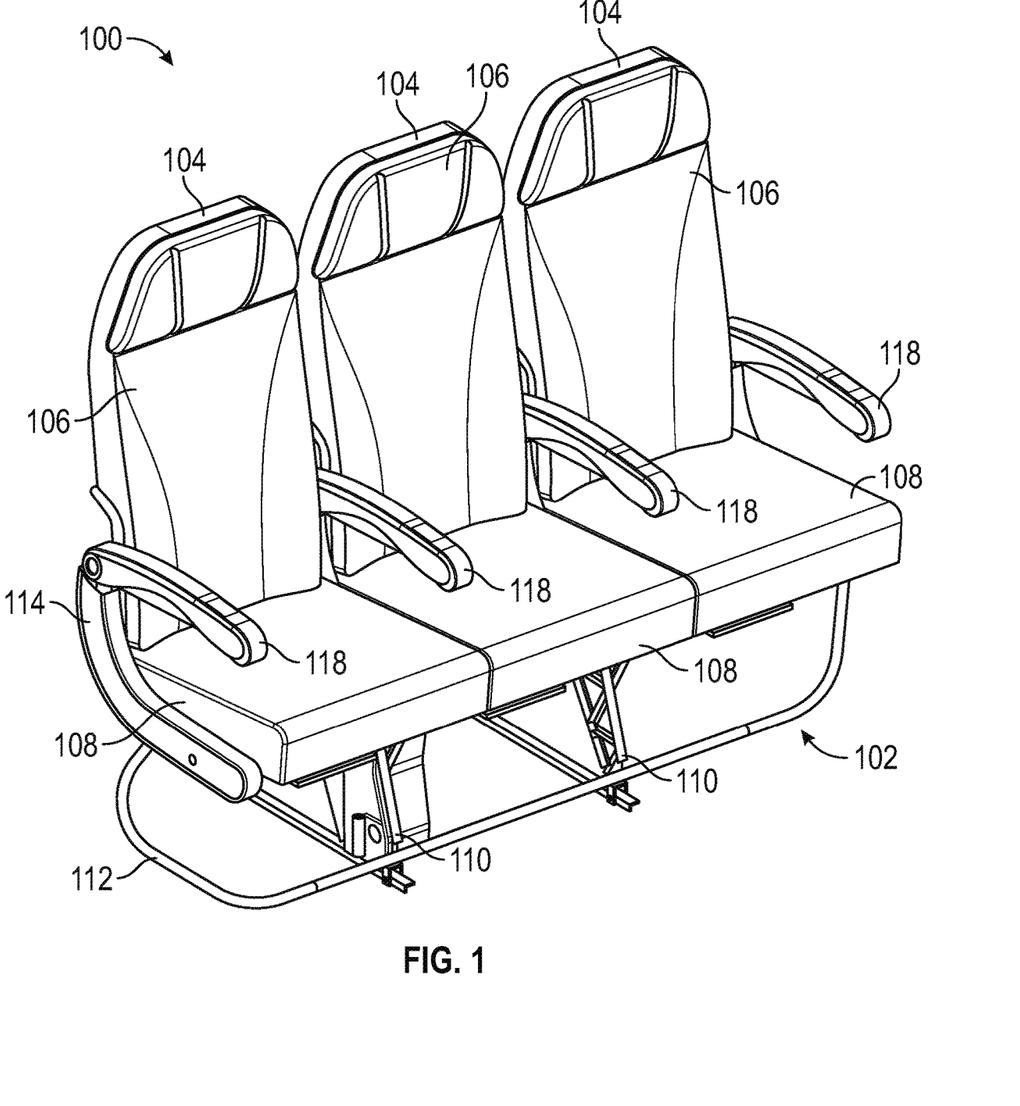
FIG. 1 is a perspective view of a passenger seat assembly in accordance with an aspect of the current disclosure.

Referring to FIG. 1, a passenger seat assembly 100 includes a base 102 and back support 104. In the present example, the passenger seat assembly 100 is capable of carrying a quantity of three passengers, and accordingly has three back supports 104. However, it will be appreciated that in various other examples, the passenger seat assembly 100 can be capable of carrying any desired number of passengers, such as one passenger, two passengers, three passengers, four passengers, or any other desired number of passengers. In these examples, the passenger seat assembly 100 can likewise have any desired number of corresponding back supports 104. The passenger seat assembly 100 may also include back support cushioning 106, base cushioning 108, armrests 118, and legs 110. In some cases, the passenger seat assembly 100 optionally includes a luggage bar 112, although it need not.

Figure 2:
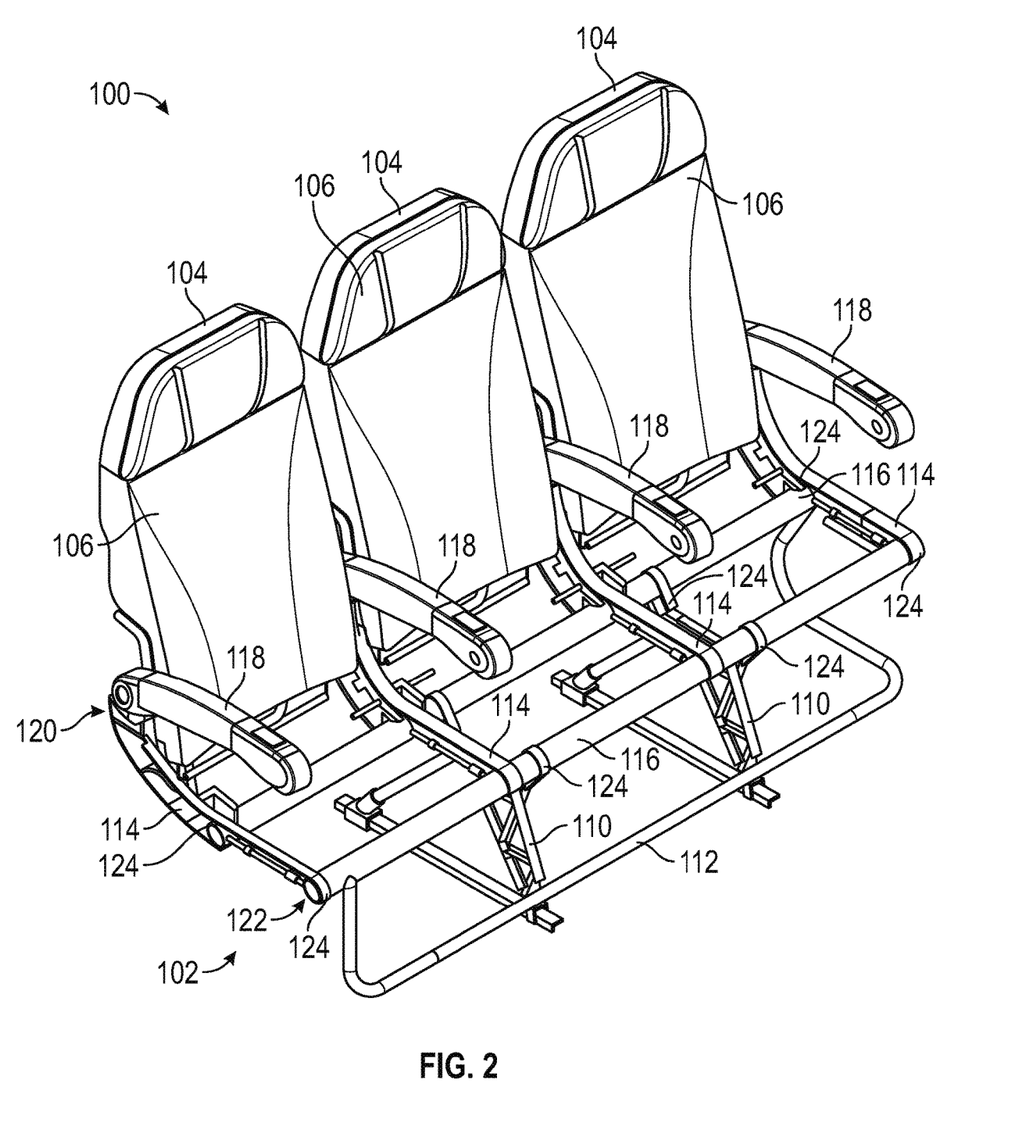
FIG. 2 is a perspective view of the passenger seat assembly of FIG. 1 with bottom cushioning removed.

FIG. 2 illustrates the passenger seat assembly 100 with the base cushioning 108 removed. As illustrated in FIG. 2, the base 102 of the passenger seat assembly 100 includes spreaders 114. The number of spreaders 114 should not be considered limiting on the current disclosure. The spreaders 114 include an aft connecting portion 120 and a forward connecting portion 122. The aft connecting portion 120 includes various attachment mechanisms, components, or locations for connecting the spreader 114 with the seat back 104 and/or armrest 118. The forward connecting portion 122 configured to support the support beams 116. The number of support beams 116 should not be considered limiting on the current disclosure.

In some examples, the forward connecting portion 122 of the spreader 114 includes two beam clamps 124. In addition, in various aspects, the legs 110 of the two beam clamps 124. However, it will be appreciated that in various other examples, any desired number of beam clamps 124 can be utilized on the various components. In some examples, beam clamps 124 may be utilized with some components and not with other components.

FIGS. 4-7 illustrate the beam clamp 124. Although reference will be made to the beam clamp 124 in conjunction with the spreader 114, it will be appreciated that the beam clamp 124 may also be a component of the legs 110 or various other components of the passenger seat assembly 100 that may clamp to the support beams 116.

The beam clamp 124 includes a keyhole 126 and a removable cam 136. The keyhole 126 is configured to be flexed between an un-flexed position 138 (illustrated in FIGS. 4, 5, and 7) and a flexed position 140 (illustrated in FIG. 6). In various aspects, a diameter of the keyhole 126 in the un-flexed position 138 is less than the diameter of the keyhole 126 in the flexed position 140, as described in detail below. In some examples, the keyhole 126 is biased towards the un-flexed position 138 such that the un-flexed position 138 is the default position.

Figure 4:
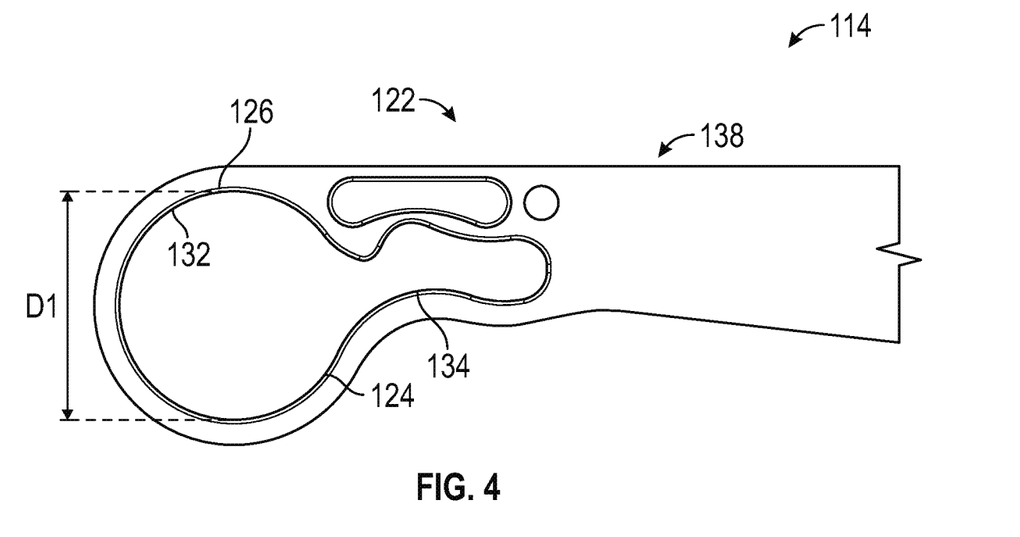
FIG. 4 is a side view of a portion of a beam clamp according to an aspect of the current disclosure.
Figure 5:
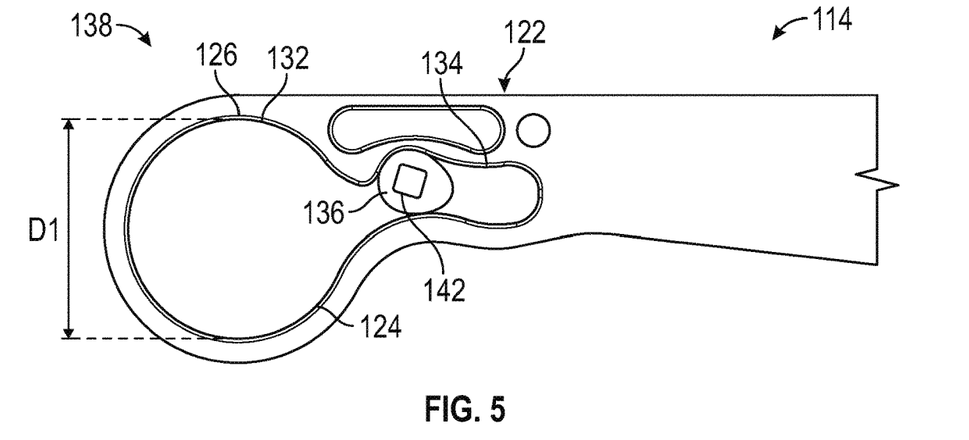
FIG. 5 is another side view of the beam clamp of FIG. 4 with a cam in an un-flexed configuration.

The keyhole 126 comprises a beam-receiving portion 132 and a cam-receiving portion 134. The beam-receiving portion 132 is configured to clamp the support beam 116, as is described in detail below. As illustrated in FIG. 4, in the un-flexed position 138, the beam-receiving portion 132 has a diameter D1, which is less than a minimum diameter of the support beam 116. In the flexed position 140, as illustrated in FIG. 5, the beam-receiving portion 132 has a diameter D2, which is greater than the diameter D1. In various cases, the diameter D2 is greater than a maximum diameter of the support beam 116.

Figure 6:
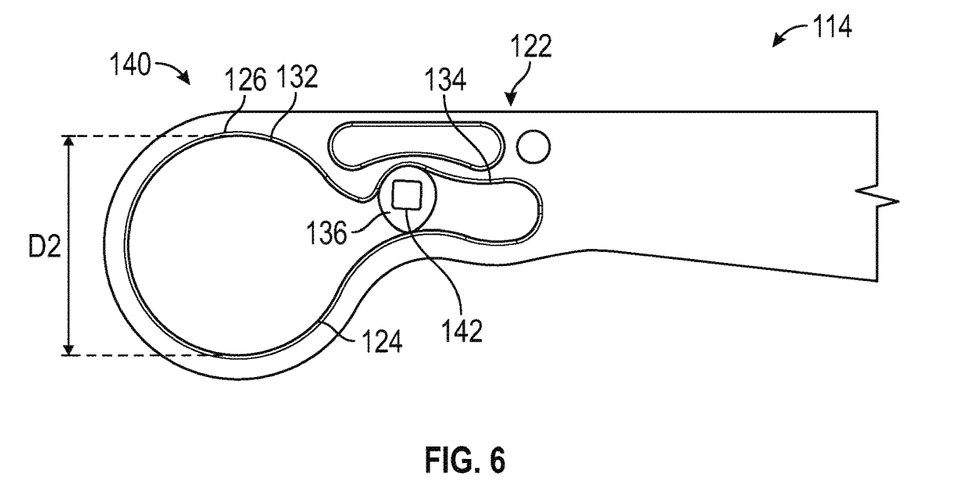
FIG. 6 is another side view of the beam clamp of FIG. 5 with the cam in a flexed configuration.

The cam-receiving portion 134 is dimensioned to receive a cam 136, which is rotatable within the cam-receiving portion 134. As described in detail below, rotation of the cam 136 causes the cam-receiving portion 134 to flex between the un-flexed position 138 and flexed position 140. In various examples, the cam 136 may have any desired shape suitable for interacting with the cam-receiving portion 134 to flex the cam-receiving portion 134 between the un-flexed position 138 and flexed position 140. In some examples, the cam 136 is removable from the beam clamp 124 such that the cam 136 can be collected and used again with other beam clamps after the assembly of the initial beam clamp 124 with the support beam 116.

A method of assembling the beam clamp 124 with the support beam 116 is also provided. In some examples, the method includes positioning the cam 136 within the cam-receiving portion 134 of the keyhole 126 while the keyhole 126 is in the flexed position 140. In some cases, the keyhole 126 is in the flexed position 140 through an expander or other suitable tool for expanding the keyhole 126 from the un-flexed position 138 to the flexed position 140. After the cam 136 is located within the keyhole 126, the expander is removed and the keyhole 126 can return to the un-flexed position 138.

The cam 136 is rotated within the cam-receiving portion 134 to flex the cam-receiving portion 134 from the un-flexed position 138 to the flexed position 140. In some cases, a tool (not illustrated) engages a tool bore 142 of the cam 136 to rotate the cam 136, although it need not.

Flexing the cam-receiving portion 134 causes the beam-receiving portion 132 to flex from the un-flexed position 138 to the flexed position 140 such that the diameter of the beam-receiving portion 132 increases from D1 to D2. While the beam-receiving portion 132 has the diameter D2, the support beam 116 is slid into the beam-receiving portion 132 to a desired position. In some cases, positioning aides or guides, such as bores, ridges, tabs, etc., may be utilized with the beam clamp 124 and/or support beam 116 to aid in positioning of the support beam 116 within the beam-receiving portion 132.

Figure 7:
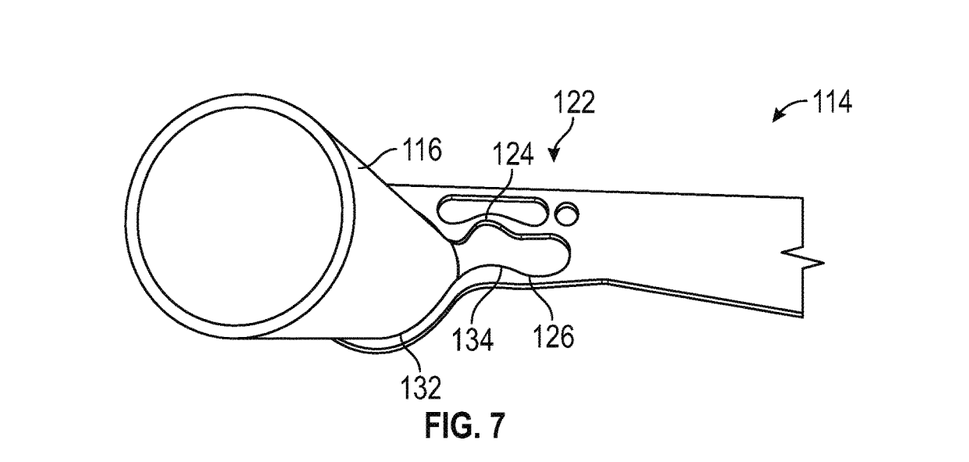
FIG. 7 is a perspective view of the beam clamp of FIG. 4 on a horizontal beam.

When the support beam 116 is located at the desired position within the keyhole 126, the cam 136 is rotated such that the cam-receiving portion 134 returns back to the un-flexed position 138. As the cam-receiving portion 134 is returned to the un-flexed position 138, the beam-receiving portion 132 is similarly returned to the un-flexed position 138. In the un-flexed position 138, the beam clamp 124 closes diametrically around the support beam 116. Because the beam-receiving portion 132 has the diameter D1 in the un-flexed position 138, the beam-receiving portion 132 clamps the support beam 116 to create a firm connection. In some cases, as illustrated in FIG. 7, after the beam clamp 124 is clamped around the support beam 116, the cam 136 may be removed so that the cam 136 can be recycled and used with another beam clamp.

In some cases, assembling the beam clamp 124 with the support beam 116 may be part of a method of assembling a passenger seat. For example and without limitation, in various examples, a method of assembling a passenger seat includes assembling the seat base, which includes assembling the beam clamp with the support beam, and connecting a seat back to the seat base.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A passenger seat comprising: a seat back; and a seat base connected to the seat back, the seat base comprising a beam clamp comprising a keyhole configured to flex outwardly from an un-flexed position to a flexed position, wherein a diameter of the keyhole in the un-flexed position is less than the diameter of the keyhole in the flexed position.

EC 2. The passenger seat of any of the preceding or subsequent example combinations, wherein the seat base further comprises a support beam defining a support beam diameter, and wherein in the flexed position, the diameter of the keyhole is greater than the support beam diameter.

EC 3. The passenger seat of any of the preceding or subsequent example combinations, wherein the support beam is positioned within the keyhole of the beam clamp, and wherein in the un-flexed position, the beam clamp clamps the support beam positioned within the keyhole.

EC 4. The passenger seat of any of the preceding or subsequent example combinations, wherein the keyhole is biased towards the un-flexed position.

EC 5. The passenger seat of any of the preceding or subsequent example combinations, wherein the seat base comprises a spreader, and wherein the beam clamp is a component of the spreader.

EC 6. The passenger seat of any of the preceding or subsequent example combinations, wherein the seat base comprises a seat leg, and wherein the beam clamp is a component of the seat leg.

EC 7. The passenger seat of any of the preceding or subsequent example combinations, wherein the keyhole comprises a beam-receiving portion and a cam-receiving portion.

EC 8. The passenger seat of any of the preceding or subsequent example combinations, further comprising a cam positioned within the cam-receiving portion of the keyhole, wherein the cam is rotatable to flex the keyhole between the un-flexed position and the flexed position.

EC 9. The passenger seat of any of the preceding or subsequent example combinations, wherein the cam is removably positioned within the cam-receiving portion.

EC 10 A passenger seat base comprising: a support beam defining a support beam diameter; and a beam clamp comprising a keyhole comprising a beam-receiving portion and a cam-receiving portion, the beam-receiving portion configured to flex outwardly from a un-flexed position to a flexed position, wherein a diameter of the beam-receiving portion in the un-flexed position is less than the support beam diameter.

EC 11. The passenger seat base of any of the preceding or subsequent example combinations, further comprising a cam removably positioned in the cam-receiving portion, the cam rotatable between a flexed position and an un-flexed position.

EC 12. The passenger seat base of any of the preceding or subsequent example combinations, wherein the diameter of the beam-receiving portion of the keyhole in the flexed position is greater than the support beam diameter.

EC 13. The passenger seat base of any of the preceding or subsequent example combinations, wherein the beam-receiving portion is biased towards the un-flexed position.

EC 14. The passenger seat base of any of the preceding or subsequent example combinations, further comprising a cam positioned within the cam-receiving portion of the keyhole, wherein the cam is rotatable to flex the beam-receiving portion between the un-flexed position and the flexed position.

EC 15. A method of assembling a passenger seat comprising: assembling a seat base, wherein assembling the seat base comprises: flexing a keyhole of a beam clamp outwards from an un-flexed position to a flexed position; and inserting a support beam within the keyhole in the flexed position; and connecting a seat back to the seat base.

EC 16. The method of any of the preceding or subsequent example combinations, wherein flexing the keyhole of the beam clamp outwards comprises: positioning a cam within the keyhole; and rotating the cam within the keyhole from an un-flexed position to a flexed position.

EC 17. The method of any of the preceding or subsequent example combinations, wherein assembling the seat base further comprises returning the keyhole to the un-flexed position after inserting the support beam within the keyhole.

EC 18. The method of any of the preceding or subsequent example combinations, wherein returning the keyhole to the un-flexed position further comprises rotating a cam positioned within the keyhole from a flexed position to an un-flexed position.

EC 19. The method of any of the preceding or subsequent example combinations, wherein assembling the seat base further comprises removing the cam from the keyhole after rotating the cam from the flexed position to the un-flexed position.

EC 20. The method of any of the preceding or subsequent example combinations, wherein a diameter of the keyhole in the un-flexed position is less than a support beam diameter of the support beam, and wherein the diameter of the keyhole in the flexed position is greater than the support beam diameter of the support beam.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A passenger seat comprising:
   a seat back; and
   a seat base connected to the seat back, the seat base comprising a beam clamp comprising a keyhole configured to flex outwardly from an un-flexed position to a flexed position,
   wherein a diameter of the keyhole in the un-flexed position is less than the diameter of the keyhole in the flexed position,
   wherein the keyhole comprises a beam-receiving portion and a cam-receiving portion,
   wherein a cam is positioned within the cam-receiving portion of the keyhole, and
   wherein the cam is rotatable to flex the keyhole between the un-flexed position and the flexed position.

2. The passenger seat of claim 1, wherein the seat base further comprises a support beam defining a support beam diameter, and wherein in the flexed position, the diameter of the keyhole is greater than the support beam diameter.

3. The passenger seat of claim 2, wherein the support beam is positioned within the keyhole of the beam clamp, and wherein in the un-flexed position, the beam clamp clamps the support beam positioned within the keyhole.

4. The passenger seat of claim 1, wherein the keyhole is biased towards the un-flexed position.

5. The passenger seat of claim 1, wherein the seat base comprises a spreader, and wherein the beam clamp is a component of the spreader.

6. The passenger seat of claim 1, wherein the seat base comprises a seat leg, and wherein the beam clamp is a component of the seat leg.

7. The passenger seat of claim 1, wherein the cam is removably positioned within the cam-receiving portion.

8. A passenger seat base comprising:
   a support beam defining a support beam diameter;
   a beam clamp comprising a keyhole comprising a beam-receiving portion and a cam-receiving portion, the beam-receiving portion configured to flex outwardly from an un-flexed position to a flexed position, wherein a diameter of the beam-receiving portion in the un-flexed position is less than the support beam diameter, and
   a cam removably positioned in the cam-receiving portion, the cam rotatable between a flexed position and an un-flexed position.

9. The passenger seat base of claim 8, wherein the diameter of the beam-receiving portion of the keyhole in the flexed position is greater than the support beam diameter.

10. The passenger seat base of claim 8, wherein the beam-receiving portion is biased towards the un-flexed position.

11. The passenger seat base of claim 8, further comprising a cam positioned within the cam-receiving portion of the keyhole, wherein the cam is rotatable to flex the beam-receiving portion between the un-flexed position and the flexed position.

12. A method of assembling a passenger seat comprising:
   assembling a seat base, wherein assembling the seat base comprises:
      flexing a keyhole of a beam clamp outwards from an un-flexed position to a flexed position, wherein flexing the keyhole of the beam clamp outwards comprises:
         positioning a cam within the keyhole; and
         rotating the cam within the keyhole from an un-flexed position to a flexed position; and
      inserting a support beam within the keyhole in the flexed position, and connecting a seat back to the seat base.

13. The method of claim 12, wherein assembling the seat base further comprises returning the keyhole to the un-flexed position after inserting the support beam within the keyhole.

14. The method of claim 13, wherein returning the keyhole to the un-flexed position further comprises rotating a cam positioned within the keyhole from a flexed position to an un-flexed position.

15. The method of claim 14, wherein assembling the seat base further comprises removing the cam from the keyhole after rotating the cam from the flexed position to the un-flexed position.

16. The method of claim 14, wherein a diameter of the keyhole in the un-flexed position is less than a support beam diameter of the support beam, and wherein the diameter of the keyhole in the flexed position is greater than the support beam diameter of the support beam.

* * * * *